May 5, 1936.  H. G. SAAL  2,039,557
AUTOMATIC RELEASE DEVICE FOR PHONOGRAPH RECORDS
Original Filed March 16, 1931   3 Sheets-Sheet 1
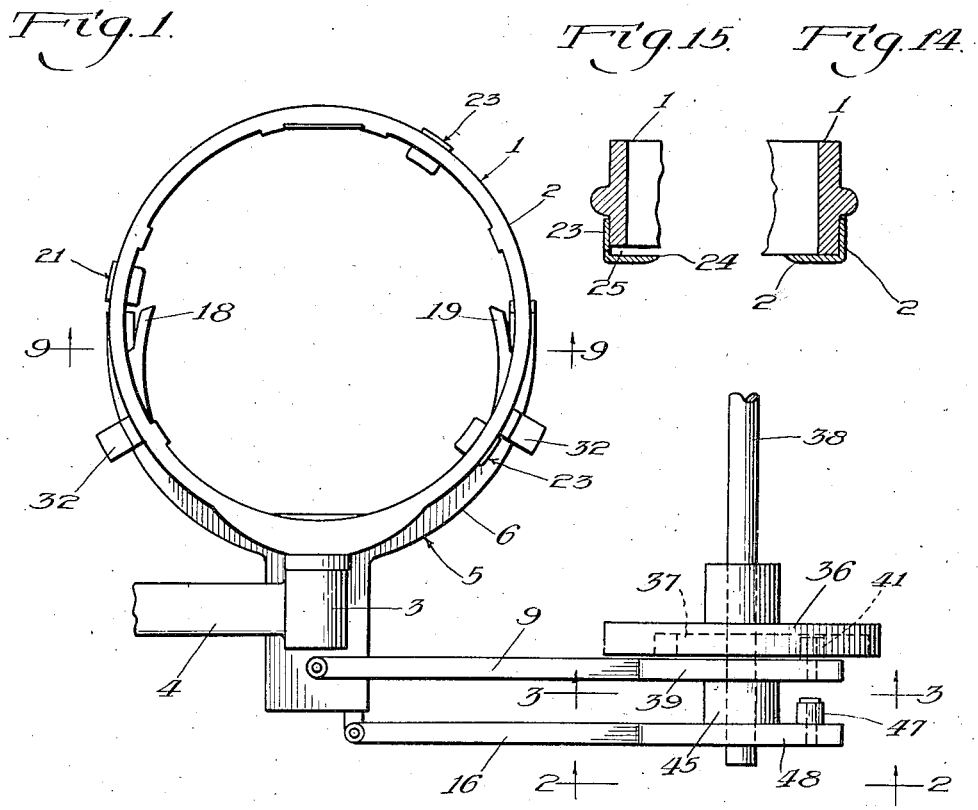
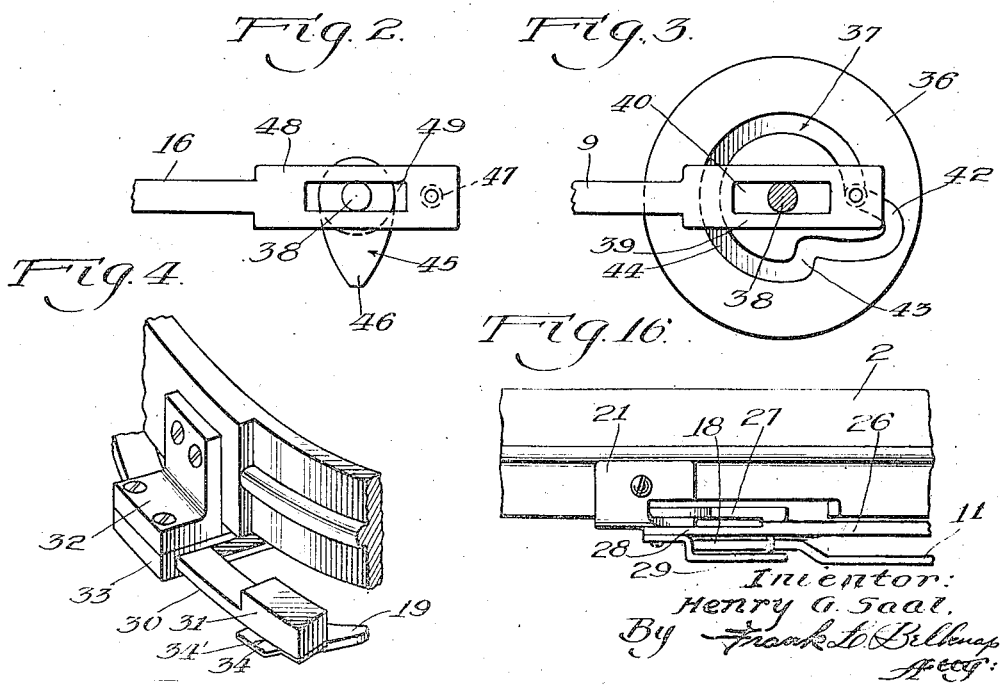
Inventor:
Henry G. Saal.
By Frank L. Belknap
Atty.

May 5, 1936.  H. G. SAAL  2,039,557
AUTOMATIC RELEASE DEVICE FOR PHONOGRAPH RECORDS
Original Filed March 16, 1931  3 Sheets-Sheet 2
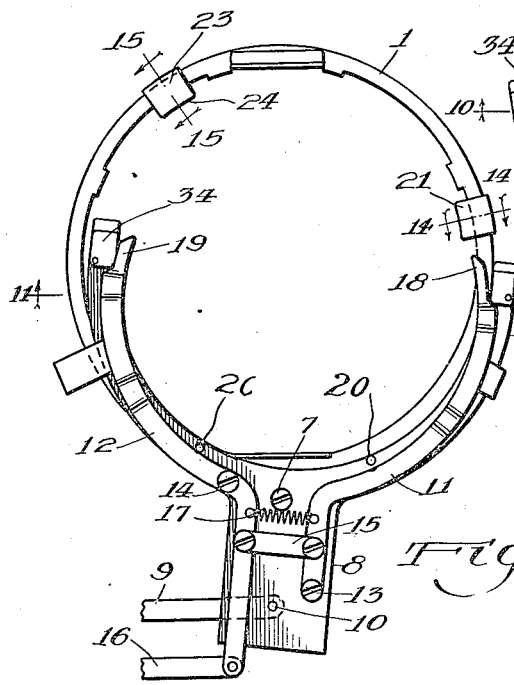
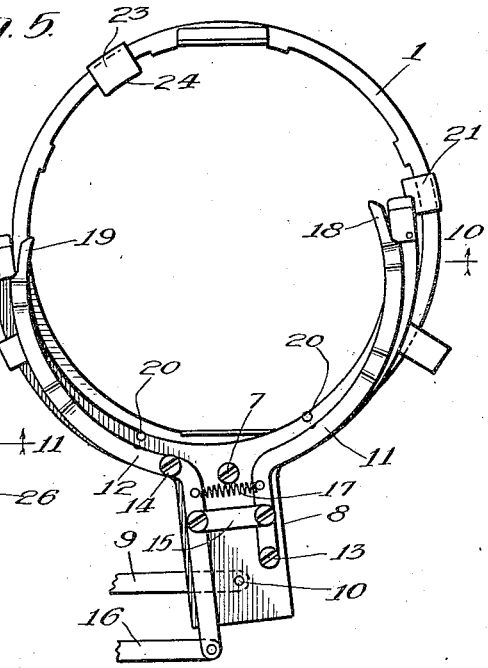
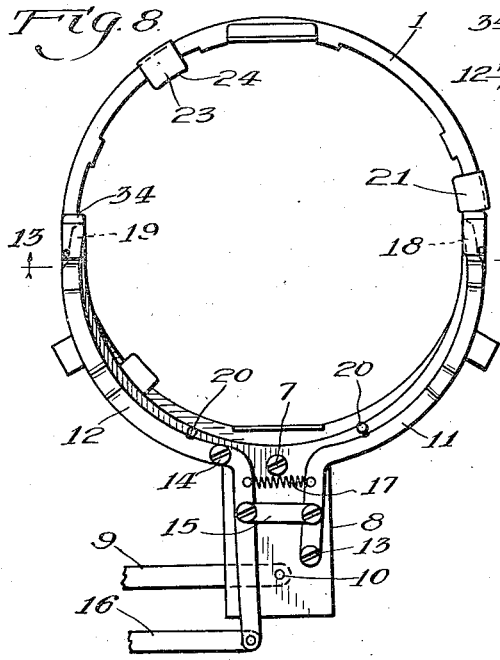
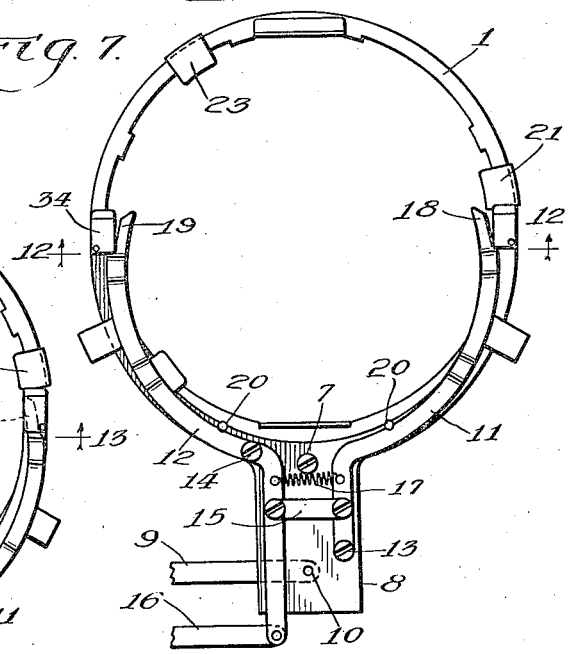
Inventor:
Henry G. Saal,
By Frank L. Belknap
Atty.

May 5, 1936.                    H. G. SAAL                    2,039,557
             AUTOMATIC RELEASE DEVICE FOR PHONOGRAPH RECORDS
                 Original Filed March 16, 1931    3 Sheets-Sheet 3
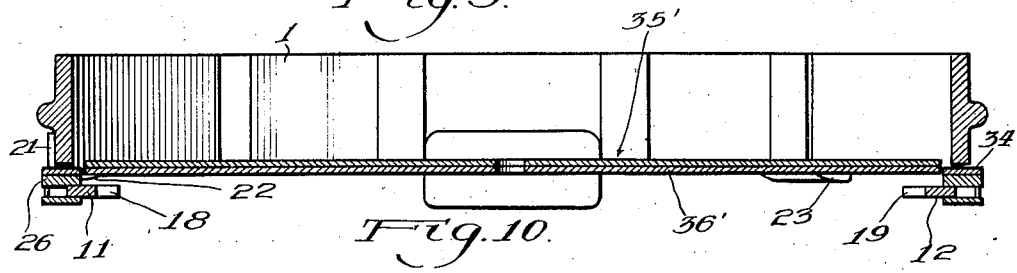
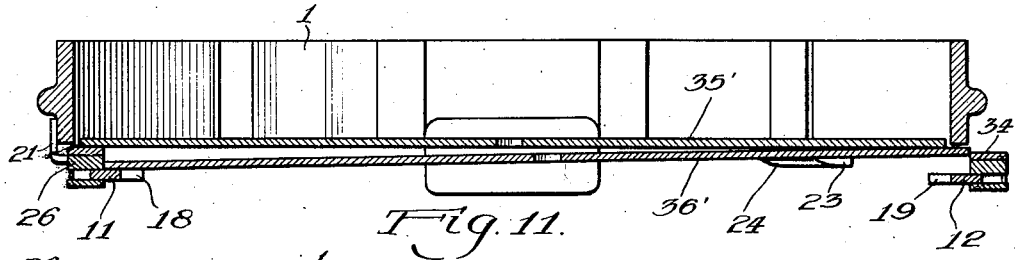
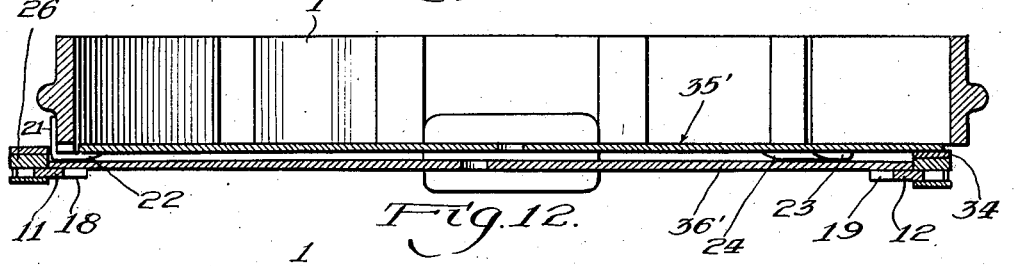
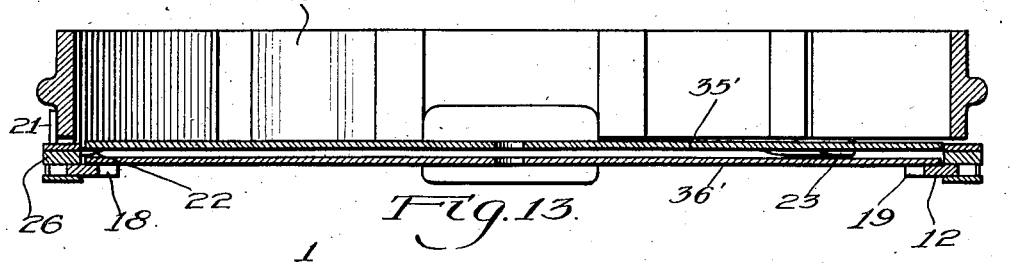
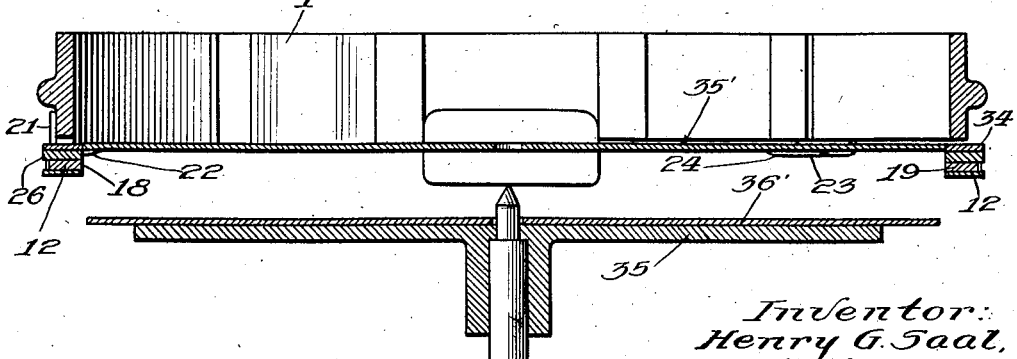
Inventor:
Henry G. Saal,
By Frank L. Belknap
      Atty.

Patented May 5, 1936

2,039,557

UNITED STATES PATENT OFFICE 2,039,557

AUTOMATIC RELEASE DEVICE FOR PHONOGRAPH RECORDS

Henry G. Saal, McHenry, Ill.; Alice M. Saal and Vena Linwood Foulds executrices of the estate of said Henry G. Saal, deceased Application March 16, 1931, Serial No. 522,812
Renewed January 9, 1935

4 Claims. (Cl. 274—10)

This invention relates to improvements in phonograph record magazines and refers specifically to the provision of means for automatically selectively releasing at predetermined periodic intervals the lowermost record of a stack of phonograph records.

The utility, objects and advantages of my invention will be apparent from the accompanying drawings and following detail description.

In the drawings, Fig. 1 is a top plan view of my improved phonograph record magazine and a cam arrangement for operating the same.

Fig. 2 is a sectional view taken on the line 2—2 of Fig. 1.

Fig. 3 is a sectional view taken on the line 3—3 of Fig. 1.

Fig. 4 is a detail perspective view of a portion of the magazine and the record releasing arms.

Fig. 5 is a bottom plan view showing the first position of the selector mechanism.

Fig. 6 is a bottom plan view illustrating the second position of said mechanism.

Fig. 7 is a similar view of the third position.

Fig. 8 is a bottom plan view of the device in record releasing position.

Fig. 9 is a sectional view of the device taken on the line 9—9 of Fig. 1 showing the same in neutral position.

Fig. 10 is a sectional view taken on the line 10—10 of Fig. 5.

Fig. 11 is a sectional view taken on the line 11—11 of Fig. 6.

Fig. 12 is a sectional view taken on the line 12—12 of Fig. 7.

Fig. 13 is a sectional view taken on the line 13—13 of Fig. 8 showing a turntable disposed beneath the magazine.

Fig. 14 is a sectional view taken on the line 14—14 of Fig. 6.

Fig. 15 is a sectional view taken on the line 15—15 of Fig. 6.

Fig. 16 is a fragmentary elevational view showing the cooperative relationship of one end of the selector arm and a record supporting lug.

Referring in detail to the drawings, 1 indicates a magazine for the storing of a plurality of phonograph records. Magazine 1 may be utilized, if desired, in connection with an automatic phonograph record changing device and may comprise a cylindrical ring 2 into which a plurality of disc records is adapted to be inserted. The diameter of the ring 2 may be slightly larger than the diameter of the usual phonograph record. Of course, it is to be understood that the principles of my invention are applicable to records of any size. The ring 2 may be provided with a projection 3 which may, if desired, be formed integral with said ring. A supporting arm 4 may be mounted upon the projection 3 and may be supported at the opposite end by a movable or stationary support, not shown. It is to be understood, of course, that the magazine 1 may be utilized in conjunction with substantially any type automatic record changing device and, hence, the means for supporting the member 4, whether movable or stationary, will depend upon the particular type of automatic phonograph record changing device with which my invention is to be used.

A selecting device 5 comprising an arcuate member 6 of substantially the same curvature as the ring 2 may be pivotally mounted upon said ring as shown best at 7 in Figs. 5 to 8 inclusive. The member 5 may be provided with an outwardly extending portion 8 to which a link 9 may be pivotally attached as at 10. It can readily be seen by this construction that when longitudinal motion of link 9 is effected, the element 5 may be swung about the pivot point 7.

A pair of arms 11 and 12 may be pivotally mounted upon the member 5 at 13 and 14 respectively, said arms being interconnected between the two pivot points by connecting link 15, and an actuating link 16 may be attached to the arm 12 which may be adapted to swing said arm about the pivot point 14. By the provision of the connecting link 15, the swinging motion thus imparted to the arm 12 will also be transmitted to the arm 11 by the connecting link 15 and hence said arms will move in unison. The arms 11 and 12 may be connected by a tension spring 17 which may normally tend to impel the outer ends 18 and 19 of the arms 11 and 12 respectively toward each other. The motion of the arms 11 and 12 imparted thereto by the spring 17 is limited by pins 20 mounted upon the lower surface of the element 5.

A lug 21 may be mounted upon one side of the ring 2 and may be bent inwardly toward the center of said ring as shown best at 22 in Fig. 14, the bent portion 22 lying flush with the lower edge of the ring. The opposite half of the ring 2 may be provided with one or more lugs 23 having inwardly projecting ends 24 shown best in Fig. 15. The upper surface of the projecting ends 24 of the lugs 23 may be spaced from the bottom of the ring 2, as shown at 25, a distance greater than the thickness of the average phonograph record and less than the thickness of two records. The lugs 21 and 23 normally support a stack of disc records within the ring 2, and the upper surfaces of the projecting ends of said lugs are preferably all maintained in the same plane. Hence, it can be readily seen that the lower edge of that half of the ring carrying lugs 23 must be cut away.

One end 26 of the arcuate member 6 may be forked providing two prongs 27 and 28, the lower of said prongs, that is, prong 28, having mounted thereon an angularly bent depending lug 29. The arrangement is such that the upper prong 27 normally rests upon the inner portion of the upper surface of the inwardly projecting end 22 of the lug 21, whereas the lower prong 28 is normally positioned adjacent the lower surface of said projecting end 22.

The opposite end 30 of the arcuate member 6 may be provided with an upwardly projecting block 31 which may properly space the plane of the arm 30 from the lower edge of the ring 2 in the same plane with the arm 26, the upper surface of the block 31 being adapted to slide adjacent the lower edge of the ring 2. Angle members 32 may be mounted upon each side of the ring 2 and may be adapted to support the slotted block 33 which may serve as a guide for the horizontal swinging motion of the arcuate element 6 and may limit the outward swing of the arms 26 and 30 when the member 5 is rotated about the pivot point 7. A lug 34 may be mounted upon and spaced from the lower side portion of the block 31 upon arm 30 of element 6, and may form a slot 34' in which the end 19 of the arm 12 may be adapted to swing. The end 18 of the arm 11 is adapted to swing between the lug 29 and the lower surface of the arm 28 as shown best in Fig. 16. The relationship of the lug 34 to the lower side of the block 31 being the same as that of the lug 29 to the lower side of the prong 28.

In utilizing my invention a plurality of phonograph records 35' of the disc type may be inserted within ring 2 and are adapted to be supported by the lugs 21 and 23, the lowermost record 36' of the stack of records within the ring 2 resting upon the upper surfaces of the ends 24 and 22.

To release said lowermost record, longitudinal motion may be imparted to the link 9 which may rotate element 6 about the pivot point 7. In so doing the arm 26 of the element 6 is moved inwardly toward the center of the ring 2 and hence the upper prong 27 mounted upon said arm contacts the edge of the record 36' positioned upon the end 22 of the prong 21, and pushes said record to an eccentric position with respect to the remaining records within the ring. In other words, the edge of the record 36' resting upon the lug 22 is removed therefrom and the opposite edge of the record is inserted in the slot 25. As the record is pushed from the lug 22 by the upper prong 27 of the arm 26, it falls to rest upon the end 18 of the arm 11 and hence may be supported at one point upon said end and at a plurality of points upon the upper surfaces of the ends 24 of the lugs 23. This position is shown best in Figs. 5 and 10.

Motion in the opposite direction may then be imparted to the link 9 and the element 6 may be rotated about pivot point 7 in the opposite direction. As shown best in Figs. 6 and 10, the arrangement is such that the end 30 of the element 6 is moved inwardly toward the center of the ring, and the inner side of block 31 contacts that edge of the record 36' which may be supported upon the ends 24 of the lugs 23. As the arm 30 moves toward the center of the ring the edge of the record resting upon the lugs 24 is removed from said lugs and falls to rest upon the end 19 of the arm 12. At this period said lowermost record is positioned in a plane below the plane of the lugs 22 and 24, and is supported upon the ends 18 and 19 of the arms 11 and 12. This position is shown best in Figs. 7 and 11.

A force may then be applied to the link 9 which may swing element 6 into its normal position, thereby centering the record 36' carried upon the ends 18 and 19 of the arms 11 and 12 respectively with respect to the ring 2. At this period a force may be applied to the link 16 which may tend to separate the ends 18 and 19 from each other and, hence, the record supported by said ends drops to a turntable 35 or, if desired, the record may be dropped to a suitable conveyor, not shown, which in turn may convey the record to a turntable.

It is to be understood, of course, that numerous mechanisms may be devised for imparting the desired motions to the links 9 and 16 to properly swing the element 6 and the arms 11 and 12. As an example of one form of mechanism which may accomplish this result, a cam 36 having a slot 37 formed in one side surface thereof may be mounted upon a rotatable shaft 38 and link 9 may terminate in a member 39 provided with a slot 40 through which the shaft 38 may be adapted to extend. The end of the member 39 may be provided with a roller or follower 41 which may be adapted to operate within the slot 37 upon rotation of the shaft 38. The configuration of the slot 37 may be such as to move the link 9 to the right a distance as determined by that portion 42 of the slot 37, and thereafter move the link 9 a distance in the opposite direction as determined by the portion 43 of the slot 37. Thereafter, the link may be returned to its original position as determined by the circular portion 44 of the slot 37.

Cam 45 may be mounted upon the shaft 38 and may be provided with a projecting extension 46 which may be adapted to contact roller or follower 47 mounted upon the end of the bar 16. The end of the bar 16 may be provided with element 48 which may in turn be provided with a slot 49 through which the shaft 38 may pass. The cams 36 and 45 may be so positioned with respect to each other upon shaft 38 that after the element 6 has been rotated to the left and then to the right and brought back to normal position, the projecting end 46 of the cam 45 will have rotated to a position wherein said projecting end will contact follower 47 and, hence, link 16 will be so moved as to separate the ends 18 and 19 of the arms 11 and 12 respectively and release the record 36'.

It is to be understood, of course, that the ring 2 may be constructed to receive substantially as many records as desired merely by constructing the walls of the ring to a greater depth. Moreover, instead of utilizing a plurality of lugs 23, one may be used.

If desired one motion of the mechanism may be eliminated, namely, that motion wherein the record 36' deposited upon the ends 18 and 19 of the arms 11 and 12 is brought to central position before the releasing operation takes place, inasmuch as can be readily seen, the record 36' may be released after two motions of the selector mechanism 5.

Many other modifications of my mechanism may be devised by anyone skilled in the art without departing from the spirit of my invention and, hence, I do not wish to be limited except as necessitated by the prior art.

I claim as my invention:

1. A selector mechanism for selectively releasing a phonograph record from a record magazine which comprises in combination, a magazine for retaining a stack of phonograph records including a housing, spaced lugs upon the lower edge of said housing for supporting said stack of records within said housing, means for removing the lowermost record from said lugs to a secondary support associated with said magazine comprising an element pivotally mounted upon the lower side of the housing, a plurality of arms pivotally mounted upon said element, said element being adapted to remove said record from said lugs and deposit the same upon said arms, and means for removing said arms from supporting position beneath said record.

2. In combination, a selector mechanism for selectively releasing a phonograph record from a record magazine, comprising means for supporting a stack of records within said magazine including spaced lugs mounted upon said magazine, means for removing the lowermost record of said stack from one of said lugs, secondary means associated with said removing means for supporting that portion of the record supported by said lug, means for removing said record from the remaining lug and secondary means associated with said second removing means for supporting that portion of the record supported by said latter lug, and means for removing said secondary supporting means from supporting position.

3. In combination, a record magazine for an automatic record changing device comprising means for supporting a stack of records within said magazine including spaced lugs associated with said magazine, means for slidably removing the lowermost record of said stack from one of said lugs, secondary means associated with said removing means for supporting that portion of the record supported by said lug, means for slidably removing said record from the remaining lug and secondary means associated with said second removing means for supporting that portion of the record supported by said latter lug, and means for removing said secondary supporting means from record supporting position.

4. A selector mechanism for selectively releasing a phonograph record from a record magazine which comprises in combination, a magazine, lugs spacedly mounted upon said magazine supporting a stack of records, means for removing the lowermost record in said stack from one of said lugs comprising a member pivotally mounted upon said housing having an arm adjacent said lug for shifting said record from the lug, secondary supporting means associated with said arm for supporting that portion of the record shifted from said lug, a second arm of said element disposed upon a substantially opposite side of the housing for removing the record from another lug, secondary supporting means associated with said second arm for supporting that portion of the record supported by said second lug, and means for removing said secondary supporting means from supporting position with respect to said record.

HENRY G. SAAL.